(12) United States Patent
Kim et al.

(10) Patent No.: US 11,823,480 B2
(45) Date of Patent: Nov. 21, 2023

(54) METHOD FOR TRAINING IMAGE CLASSIFICATION MODEL AND APPARATUS FOR EXECUTING THE SAME

(71) Applicant: SAMSUNG SDS CO., LTD., Seoul (KR)

(72) Inventors: Byoung Jip Kim, Seoul (KR); Jin Ho Choo, Seoul (KR); Yeong Dae Kwon, Seoul (KR); Jin Yeop Chang, Seoul (KR); Young June Gwon, Seoul (KR); Seung Jai Min, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 393 days.

(21) Appl. No.: 17/336,445

(22) Filed: Jun. 2, 2021

(65) Prior Publication Data

US 2021/0374477 A1 Dec. 2, 2021

(30) Foreign Application Priority Data

Jun. 2, 2020 (KR) .................. 10-2020-0066688

(51) Int. Cl.
*G06V 40/10* (2022.01)
*G06N 5/04* (2023.01)
(Continued)

(52) U.S. Cl.
CPC ........ *G06V 40/103* (2022.01); *G06F 18/2148* (2023.01); *G06F 18/2155* (2023.01);
(Continued)

(58) Field of Classification Search
CPC .. G06V 40/103; G06V 10/242; G06V 10/774; G06V 10/776; G06V 10/7796;
(Continued)

(56) References Cited

U.S. PATENT DOCUMENTS 11,308,353 B2 * 4/2022 Singh .................... G06F 18/214
2021/0125000 A1 * 4/2021 Kim ...................... G06F 18/254
(Continued)

FOREIGN PATENT DOCUMENTS

KR        10-1934325 B1      1/2019

OTHER PUBLICATIONS

Bibas, Koby, et al. "Learning rotation invariant features for cryogenic electron microscopy image reconstruction." 2021 IEEE 18th International Symposium on Biomedical Imaging (ISBI). IEEE, 2021. (Year: 2021).*
(Continued)

*Primary Examiner* — Bobbak Safaipour
(74) *Attorney, Agent, or Firm* — Sughrue Mion, PLLC

(57) ABSTRACT

A method for training an image classification model according to an embodiment includes training a feature extractor and a rotation angle classifier to predict a rotation angle of each of unlabeled first training images, training the image classification model to predict a label and rotation angle of each of labeled second training images, but predict a uniform label even though an actual rotation angle of each of the second training images is changed, generating a pseudo label based on a training image that satisfy a preset condition among unlabeled candidate images, and training the image classification model to predict a rotation angle of each of the third training images, and predict a label of each of the third training images based on the pseudo label, but predict a uniform label even though an actual rotation angle of each of the third training images is changed.

16 Claims, 8 Drawing Sheets

(51) Int. Cl.
| | |
|---|---|
| *G06N 20/00* | (2019.01) |
| *G06F 18/214* | (2023.01) |
| *G06F 18/2415* | (2023.01) |
| *G06V 10/774* | (2022.01) |
| *G06V 10/776* | (2022.01) |
| *G06V 10/778* | (2022.01) |
| *G06V 10/24* | (2022.01) |
| *G06V 10/772* | (2022.01) |

(52) U.S. Cl.
CPC ........... *G06F 18/2415* (2023.01); *G06N 5/04* (2013.01); *G06N 20/00* (2019.01); *G06V 10/242* (2022.01); *G06V 10/774* (2022.01); *G06V 10/776* (2022.01); *G06V 10/7796* (2022.01); *G06V 10/772* (2022.01)

(58) Field of Classification Search
CPC .. G06V 10/772; G06V 10/40; G06F 18/2148; G06F 18/2155; G06F 18/2415; G06F 18/28; G06F 18/24; G06N 5/04; G06N 20/00; G06N 3/045; G06N 3/084
See application file for complete search history.

(56) References Cited

U.S. PATENT DOCUMENTS

| | | | |
|---|---|---|---|
| 2021/0201152 A1* | 7/2021 | Santillán Perez | ........ G06N 3/04 |
| 2022/0392051 A1* | 12/2022 | Hur | ..................... G06V 10/7715 |
| 2023/0138206 A1* | 5/2023 | Bahl | ...................... G16H 20/17 |
| | | | 604/508 |
| 2023/0237790 A1* | 7/2023 | Valentine | ............. G06V 10/774 |
| | | | 382/157 |

OTHER PUBLICATIONS

Li, Xuemei, Huping Ye, and Shi Qiu. "Cloud contaminated multispectral remote sensing image enhancement algorithm based on MobileNet." Remote Sensing 14.19 (2022): 4815. (Year: 2022).*

Tsai, Yu-Shiuan, Alvin V. Modales, and Hung-Ta Lin. "A convolutional neural-network-based training model to estimate actual distance of persons in continuous images." Sensors 22.15 (2022): 5743. (Year: 2022).*

* cited by examiner

METHOD FOR TRAINING IMAGE CLASSIFICATION MODEL AND APPARATUS FOR EXECUTING THE SAME

CROSS-REFERENCE TO RELATED APPLICATION

This application claims the benefit under 35 USC § 119(a) of Korean Patent Application No. 10-2020-0066688, filed on Jun. 2, 2020, in the Korean Intellectual Property Office, the entire disclosure of which is incorporated herein by reference for all purposes.

BACKGROUND

1. Field

The disclosed embodiments relate to a technique for training an image classification model.

2. Description of Related Art

With remarkable advances in the field of computer vision in recent years, an image classification model that determines which category of image data a given image data belongs to is also showing performance that surpasses humans.

However, in order to train the image classification model to have such high performance, a massive amount of labeled image data is required, and labeling a large number of image data requires considerable time and manpower. Accordingly, the more it tries to enhance the performance of the model, the higher the cost required for training the image classification model inevitably increases.

SUMMARY

The disclosed embodiments are intended to allow the image classification model to have high image classification performance with only a small number of labeled images.

According to an embodiment, there is provided a method for training an image classification model including a feature extractor, a label classifier, and a rotation angle classifier, the method including a first training step of training the feature extractor and the rotation angle classifier to predict a rotation angle of each of one or more first training images selected from an unlabeled image set and rotated by a preset angle, a second training step of training the image classification model to predict a label and rotation angle of each of one or more second training images selected from a labeled image set and rotated by a preset angle, but predict a uniform label even though an actual rotation angle of each of the one or more second training images is changed, a step of generating a pseudo label based on one or more third training images that satisfy a preset condition among one or more candidate images selected from the unlabeled image set and rotated by a preset angle, and a third training step of training the image classification model to predict a rotation angle of each of the one or more third training images, and predict a label of each of the one or more third training images based on the pseudo label, but predict a uniform label even though an actual rotation angle of each of the one or more third training images is changed.

The first training step may include a step of calculating a first loss based on the rotation angle of each of the first training images predicted by the rotation angle classifier and an actual rotation angle of each of the first training images and a step of updating training parameters of the feature extractor and the rotation angle classifier based on the first loss.

The second training step may include a step of calculating a second loss based on the label and rotation angle of each of the second training images predicted by the image classification model and an actual label and actual rotation angle of each of the second training images and a step of updating training parameters of the image classification model based on the second loss.

The step of calculating the second loss may calculate the second loss based on a first label loss between the label of each of the second training images predicted by the image classification model and the actual label of each of the second training images, a first mutual information loss between a reference label and remaining labels among respective labels of the second training images predicted by the image classification model, and a first rotation angle loss between the rotation angle of each of the second training images predicted by the image classification model and the actual rotation angle of each of the second training images.

The step of generating the pseudo label may include a step of generating a clone model by duplicating the image classification model trained through the first training step and the second training step, a step of predicting a label of each of the one or more candidate images by the clone model, a step of selecting one or more images, whose predicted label is uniform even though an actual rotation angle of each of the one or more candidate images is changed, of the one or more candidate images as the one or more third training images, and a step of determining the label of each of the one or more third training images predicted by the clone model as the pseudo label for each of the third training images.

The third training step may include a step of calculating a third loss based on the label and rotation angle of each of the third training images predicted by the image classification model and the pseudo label and actual rotation angle of each of the third training images and a step of updating training parameters of the image classification model based on the third loss.

The step of calculating the third loss may calculate the third loss based on a second label loss between the label of each of the third training images predicted by the image classification model and the pseudo label of each of the third training images, a second mutual information loss between a reference label and remaining labels among respective labels of the third training images predicted by the image classification model, and a second rotation angle loss between the rotation angle of each of the third training images predicted by the image classification model and the actual rotation angle of each of the third training images.

In the method for training the image classification model, when the third loss exceeds a preset value, the second training step, the step of generating the pseudo label, and the third training step may be performed again.

According to an embodiment, there is provided an apparatus for training an image classification model, the apparatus including one or more processors and a memory storing one or more programs configured to be executed by the one or more processors, the program including instructions for causing the following steps of training an image classification model including a feature extractor, a label classifier, and a rotation angle classifier to be executed, the following steps including a first training step of training the feature extractor and the rotation angle classifier to predict a rotation angle of each of one or more first training images selected from an unlabeled image set and rotated by a preset angle, a second training step of training the image classification model to predict a label and rotation angle of each of one or more second training images selected from a labeled image set and rotated by a preset angle, but predict a uniform label even though an actual rotation angle of each of the one or more second training images is changed, a step of generating a pseudo label based on one or more third training images that satisfy a preset condition among one or more candidate images selected from the unlabeled image set and rotated by a preset angle, and a third training step of training the image classification model to predict a rotation angle of each of the one or more third training images, and predict a label of each of the one or more third training images based on the pseudo label, but predict a uniform label even though an actual rotation angle of each of the one or more third training images is changed.

The first training step may include a step of calculating a first loss based on the rotation angle of each of the first training images predicted by the rotation angle classifier and an actual rotation angle of each of the first training images and a step of updating training parameters of the feature extractor and the rotation angle classifier based on the first loss.

The second training step may include a step of calculating a second loss based on the label and rotation angle of each of the second training images predicted by the image classification model and an actual label and actual rotation angle of each of the second training images and a step of updating training parameters of the image classification model based on the second loss.

The step of calculating the second loss may calculate the second loss based on a first label loss between the label of each of the second training images predicted by the image classification model and the actual label of each of the second training images, a first mutual information loss between a reference label and remaining labels among respective labels of the second training images predicted by the image classification model, and a first rotation angle loss between the rotation angle of each of the second training images predicted by the image classification model and the actual rotation angle of each of the second training images.

The step of generating the pseudo label may include a step of generating a clone model by duplicating the image classification model trained through the first training step and the second training step, a step of predicting a label of each of the one or more candidate images by the clone model, a step of selecting one or more images, whose predicted label is uniform even though an actual rotation angle of each of the one or more candidate images is changed, of the one or more candidate images as the one or more third training images, and a step of determining the label of each of the one or more third training images predicted by the clone model as the pseudo label for each of the third training images.

The third training step may include a step of calculating a third loss based on the label and rotation angle of each of the third training images predicted by the image classification model and the pseudo label and actual rotation angle of each of the third training images and a step of updating training parameters of the image classification model based on the third loss.

The step of calculating the third loss may calculate the third loss based on a second label loss between the label of each of the third training images predicted by the image classification model and the pseudo label of each of the third training images, a second mutual information loss between a reference label and remaining labels among respective labels of the third training images predicted by the image classification model, and a second rotation angle loss between the rotation angle of each of the third training images predicted by the image classification model and the actual rotation angle of each of the third training images.

The program may further include instructions for executing the second training step, the step of generating the pseudo label, and the third training step again, when the third loss exceeds a preset value.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies related to the present invention may unnecessarily obscure the subject matter of the disclosed embodiments, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
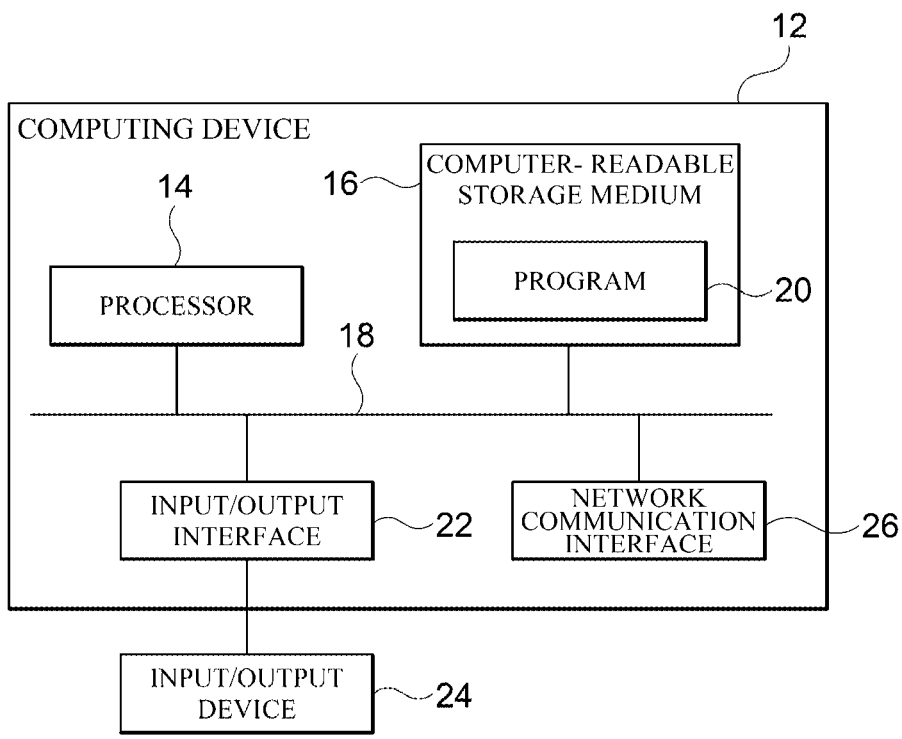
FIG. 1 is a block diagram illustratively describing a computing environment 10 including a computing device 12 suitable for use in exemplary embodiments.

FIG. 1 is a block diagram for illustratively describing a computing environment 10 that includes a computing device 12 according to an embodiment. In the illustrated embodiment, each component may have different functions and capabilities in addition to those described below, and additional components may be included in addition to those described below.

The illustrated computing environment 10 includes the computing device 12. In one embodiment, the computing device 12 may be an apparatus for performing a method for training an image classification model.

The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Figure 2:
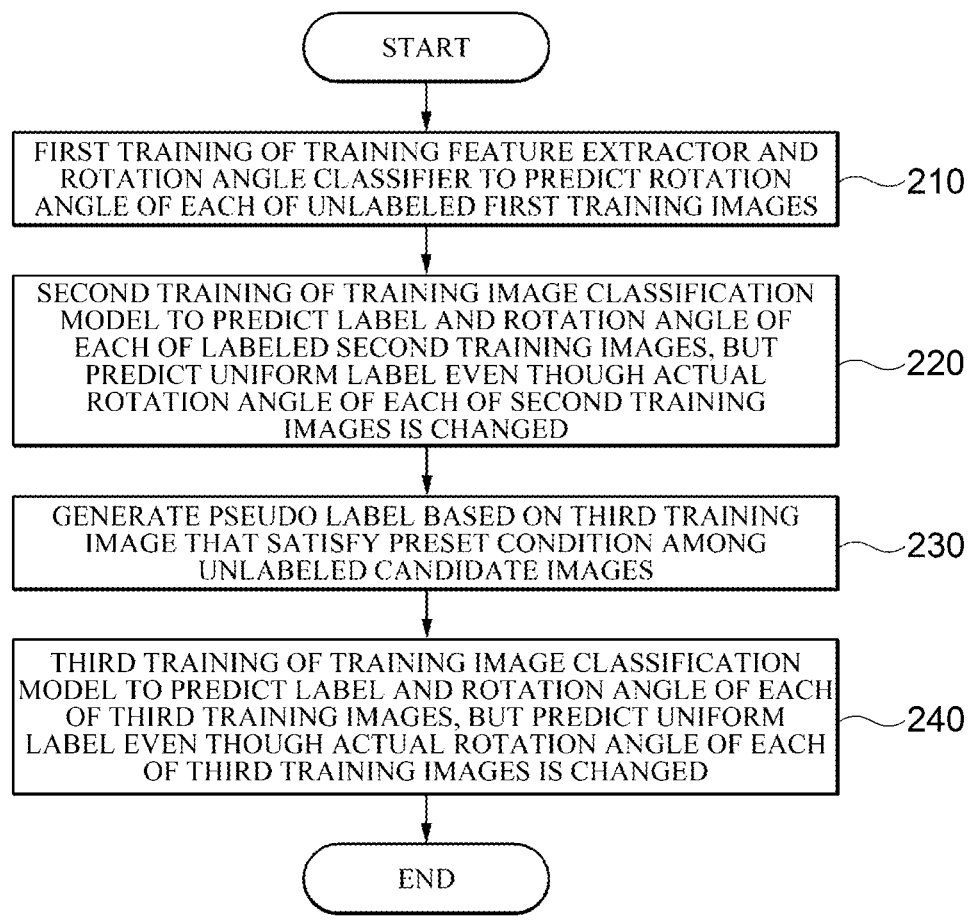
FIG. 2 is a flowchart for illustrating a method for training an image classification model according to an embodiment.

FIG. 2 is a flowchart illustrating a method for training an image classification model according to an embodiment. The method illustrated in FIG. 2 may be performed, for example, by the computing device 12 described above.

In the following, the 'image classification model' includes a feature extractor, a label classifier, and a rotation angle classifier.

In addition, hereinafter, the 'extraction unit' receives an image as an input and generates a feature vector, and includes a convolutional neural network (CNN) structure. However, the feature extractor may further include an additional structure in addition to the convolutional neural network structure, and accordingly, it is obvious that an improved network structure may be applied to the feature extractor in the future.

In addition, the 'label classifier' predicts a label of the input image based on the feature vector generated by the feature extractor, and in this case, the predicted label is a soft label, and each element of the predicted label may have a value of 0 or more and 1 or less indicating a probability corresponding to each label type.

Meanwhile, the 'rotation angle classifier' predicts a rotation angle of the input image based on the feature vector generated by the feature extractor.

In this case, the predicted rotation angle is a vector in which each element has a value of 0 or more and 1 or less, and each element of the predicted rotation angle may have a value of 0 or more and 1 or less indicating a probability that the input image corresponds to each rotation angle.

In the first training step 210, the computing device trains the feature extractor and the rotation angle classifier in the image classification model to predict the rotation angle of each of one or more first training images selected from an unlabeled image set and rotated by a preset angle.

Specifically, the selected first training image is input to the feature extractor in the image classification model, but may be input by being rotated by a preset angle each time the selected first training image is input. In this case, an unrotated image is also an image that has been rotated by 0 degrees, and thus it is obvious that the unrotated image can be used for training an image classification model. This also applies to a second training image and a third training image used in steps 220 to 240 below.

For example, if a specific image with a horse drawn is selected from unlabeled images, the image classification model may sequentially receive a horse image that is not rotated (rotated by 0 degrees), a horse image rotated by 90 degrees, a horse image rotated by 180 degrees, and a horse image rotated by 270 degrees as the first training image.

Figure 3:
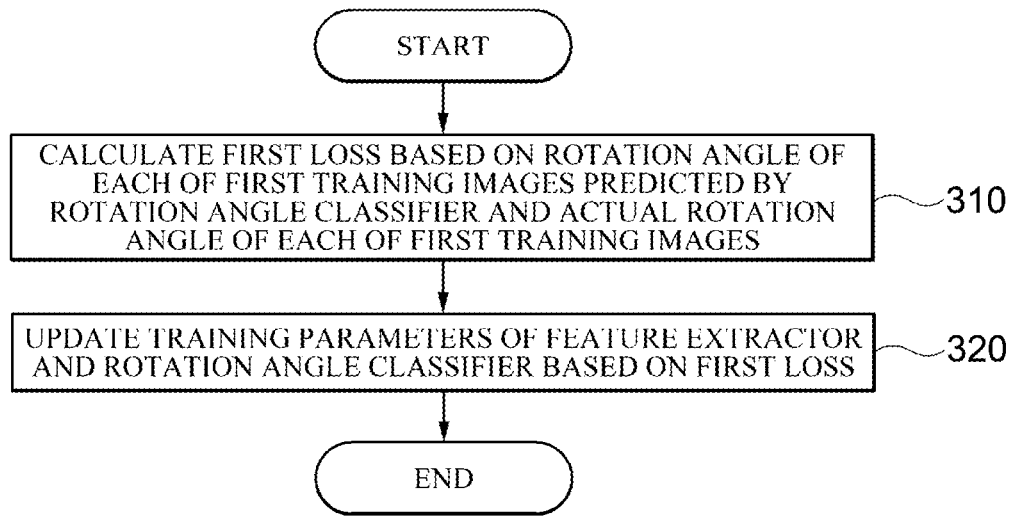
FIG. 3 is a flow chart for illustrating in detail a first training step according to an embodiment.

FIG. 3 is a flowchart for illustrating in detail the first training step 210 according to an embodiment. The method illustrated in FIG. 3 may be performed, for example, by the computing device 12 described above.

In step 310, the computing device 12 may calculate a first loss based on the rotation angle of each of the first training images predicted by the rotation angle classifier and an actual rotation angle of each of the first training images.

According to an embodiment, the computing device 12 may calculate the first loss between ground-truth and a vector corresponding to the predicted rotation angle of each of the first training images by using the vector corresponding to the actual rotation angle of each of the first training images as the ground-truth.

In this case, the vector used as the ground-truth is obtained by rotating each of the first training images, and thus the vector is not generated by separate labeling by the user.

Specifically, the first loss may be calculated by a cross-entropy function using the ground-truth and the vector corresponding to the predicted rotation angle of each of the first training image as independent variables.

More specifically, the first loss is a loss related to the rotation angle of the image, and thus the first loss may be calculated based on Equation 1 below.

$$L_1 = -\sum_{i=0}^{B} \sum_{j=0}^{n-1} y_{rot,(i),\left(\frac{360}{n}*j\right)} \log \hat{y}_{rot,(i),\left(\frac{360}{n}*j\right)}$$ [Equation 1]

In this case, $L_1$ represents the first loss, B represents the number of the first training images, n represents the number of times the image is rotated by a unit rotation angle, $$y_{rot,(i),\left(\frac{360}{n}*j\right)}$$

represents a one-hot vector corresponding to an actual rotation angle of an i-th first training image, and $$\hat{y}_{rot,(i),\left(\frac{360}{n}*j\right)}$$

represents a vector corresponding to the predicted rotation angle of the i-th first training image.

In step 320, the computing device 12 may update training parameters of the feature extractor and the rotation angle classifier based on the first loss.

According to an embodiment, the computing device 12 may update the training parameters of the extraction unit and the rotation angle classifier using a backpropagation method based on the first loss in a backward pass process.

Referring back to FIG. 2, in the second training step 220, the computing device 12 trains the image classification model to predict a label and rotation angle of each of one or more second training images selected from a labeled image set and rotated by a preset angle, but predict a uniform label even though an actual rotation angle of each of the one or more second training images is changed.

Specifically, since the rotated image contains the same object information as the image before rotation, the image classification model which has been subjected to desirable training should predict uniform labels for both the rotated image and the image before rotation. This characteristic of the image classification model is referred to as rotation consistency, and in the second training step 220, the computing device 12 trains the image classification model to have rotation consistency.

Meanwhile, the second training image is selected from a set of labeled images, and in reality, since labeled images are insufficient in most of the training processes, overfitting is highly likely to occur when the image classification model is trained using only the actual label of each of the second training images. In order to prevent this, an additional training method is required, and in this regard, description will be made in detail with reference to FIG. 4 below.

Figure 4:
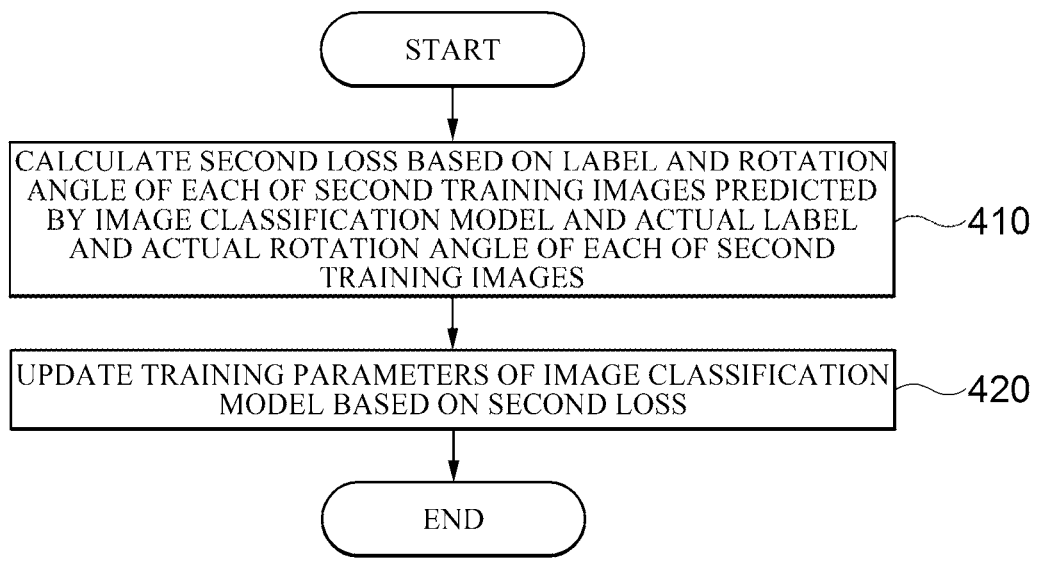
FIG. 4 is a flow chart for illustrating in detail a second training step according to an embodiment.

FIG. 4 is a flowchart for illustrating in detail the second training step 220 according to an embodiment. The method illustrated in FIG. 4 may be performed, for example, by the computing device 12 described above.

In step 410, the computing device 12 may calculate the second loss based on the label and rotation angle of each second training image predicted by the image classification model, and the actual label and actual rotation angle of each second training image.

Specifically, the computing device 12 may calculate the second loss based on the following (1) to (3).

(1) First Label Loss Between Label of Each Second Training Image Predicted by Image Classification Model and Actual Label of Each Second Training Image According to an embodiment, the computing device 12 may calculate the first label loss between ground-truth and a vector corresponding to the predicted label of each of the second training images by using the vector corresponding to the actual label each of the second training images as the ground-truth.

Specifically, the first label loss may be calculated by a cross-entropy function using the ground-truth and the vector corresponding to the predicted label of each of the second training image as independent variables.

More specifically, the first label loss is a loss related to the rotation angle of the image, and may be calculated based on Equation 2 below.

$$L_{obj1} = -\sum_{i=0}^{B}\sum_{j=0}^{n-1} y_{obj,(i),\left(\frac{360}{n}*j\right)} \log \hat{y}_{obj,(i),\left(\frac{360}{n}*j\right)} \quad \text{[Equation 2]}$$

In this case, $L_{obj1}$ represents the first label loss, B represents the number of the second training images, n represents the number of times the image is rotated by a unit rotation angle, $$y_{rot,(i),\left(\frac{360}{n}*j\right)}$$

represents a one-hot vector corresponding to an actual label of an i-th second training image, and $$\hat{y}_{obj,(i),\left(\frac{360}{n}*j\right)}$$

represents a vector corresponding to the predicted label of the i-th second training image.

(2) First Mutual Information Loss Between Reference Label and Remaining Labels Among Respective Labels of Second Training Images Predicted by Image Classification Model According to one embodiment, the computing device 12 may use a vector corresponding to the predicted label for the unrotated (rotated by 0 degrees) image among the respective predicted labels of the second training images as a reference and calculate a first mutual information loss between the reference and the vector corresponding to the labels predicted for the remaining rotated images (e.g., rotated by 90 degrees, rotated by 180 degrees, rotated by 270 degrees).

Specifically, the first mutual information loss may be calculated based on the sum of mutual information values between the reference and each vector corresponding to the labels predicted for the respective images of the remaining rotated images. In this case, the 'mutual information value' is an index indicating the interdependence between two variables, and the more the two variables depend on each other, the larger the value is.

More specifically, the first mutual information loss is a loss related to a mutual difference between the predicted image labels, and thus may be calculated based on Equations 3 and 4 below.

$$L_{MI1} = -\frac{1}{n}\sum_{i=0}^{B}\sum_{j=1}^{n-1} I\left(\hat{y}_{obj,(i),(0)}, \hat{y}_{obj,(i),\left(\frac{360}{n}*j\right)}\right) \quad \text{[Equation 3]}$$

In this case, $L_{MI1}$ represents the mutual information loss, B represents the number of second training images, n represents the number of times the image is rotated by a unit rotation angle, I(X,Y) represents a mutual information function between vector X and vector Y, $\hat{y}_{obj,(i),(0)}$ represents a vector corresponding to the predicted label of an i-th second training image rotated by 0 degrees (not rotated), and $$\hat{y}_{obj,(i),\left(\frac{360}{n}*j\right)}$$

represents a vector corresponding to the predicted label of the rotated i-th second training image.

$$I(X, Y) = \sum_{k \in X, y \in Y} p_{(X,Y)}(x, y) \log \frac{p_{(X,Y)}(x, y)}{p_X(x) p_Y(y)} \quad [\text{Equation 4}]$$

In this case, x represents an element of vector X, y represents an element of vector Y, $p_X(x)$ represents a value of a marginal distribution function corresponding to the element x in vector X, $p_Y(y)$ represents a value of the marginal distribution function corresponding to element y in vector Y, and $p_{(X,Y)}(x, y)$ represents a value of a joint distribution function corresponding to element x and element y at the same time in vectors X and Y.

(3) First Rotation Angle Loss Between Rotation Angle of Each of Second Training Images Predicted by Image Classification Model and Actual Rotation Angle of Each of Second Training Images According to an embodiment, the computing device 12 may calculate the first rotation angle loss between ground-truth and a vector corresponding to the predicted rotation angle of each of the second training images by using the vector corresponding to the actual rotation angle of each of the second training images as the ground-truth.

In this case, the vector used as the ground-truth is obtained by rotating each of the second training images, and thus the ground-truth is not generated by separate labeling by the user. Specifically, the first rotation angle loss may be calculated by a cross entropy function by using the ground-truth and the vector corresponding to the predicted rotation angle of each of the second training image as independent variables.

More specifically, the first rotation angle loss is a loss related to the rotation angle of the image, and thus the first rotation angle loss may be calculated by the following Equation 5 having a form similar to the above Equation 1.

$$L_{rot1} = -\sum_{i=0}^{B}\sum_{j=0}^{n-1} y_{rot,(i),\left(\frac{360}{n}*j\right)} \log \hat{y}_{rot,(i),\left(\frac{360}{n}*j\right)} \quad [\text{Equation 5}]$$

In this case, $L_{rot1}$ represents the first rotation angle loss, B represents the number of second training images, n represents the number of times the image is rotated by a unit rotation angle, $$y_{rot,(i),\left(\frac{360}{n}*j\right)}$$

represents a one-hot vector corresponding to an actual rotation angle of the i-th second training image, and $$\hat{y}_{rot,(i),\left(\frac{360}{n}*j\right)}$$

represents a vector corresponding to the predicted rotation angle of the i-th second training image.

According to an embodiment, the computing device 12 may calculate the second loss by performing weighted summation of the first label loss, the first mutual information loss, and the first rotation angle loss described above. In this case, a weight applied to each of the first label loss, the first mutual information loss, and the first rotation angle loss may be set by the user or may be determined by a separate process.

In step 420, the computing device 12 may update the training parameter of the image classification model based on the second loss.

According to an embodiment, the computing device 12 may update the training parameter of the image classification model by using a backpropagation method based on the second loss in the backward pass process.

Referring back to FIG. 2, in step 230, the computing device 12 generates a pseudo label based on one or more third training images that satisfy a preset condition among one or more candidate images selected from the unlabeled image set and rotated by a preset angle.

In this case, the batch number of the candidate image selected from the unlabeled image set need not necessarily be the same as the batch number of the first training image described above.

Specifically, since the third training image is an unlabeled image, the computing device 12 needs to generate a new pseudo label in order to train the image classification model using the third training image. In this case, since it is necessary to reduce the manpower and time required for labeling, it is necessary to generate a pseudo label using information generated by itself during the image classification process. In this regard, description will be made in detail with reference to FIG. 5 below.

Figure 5:
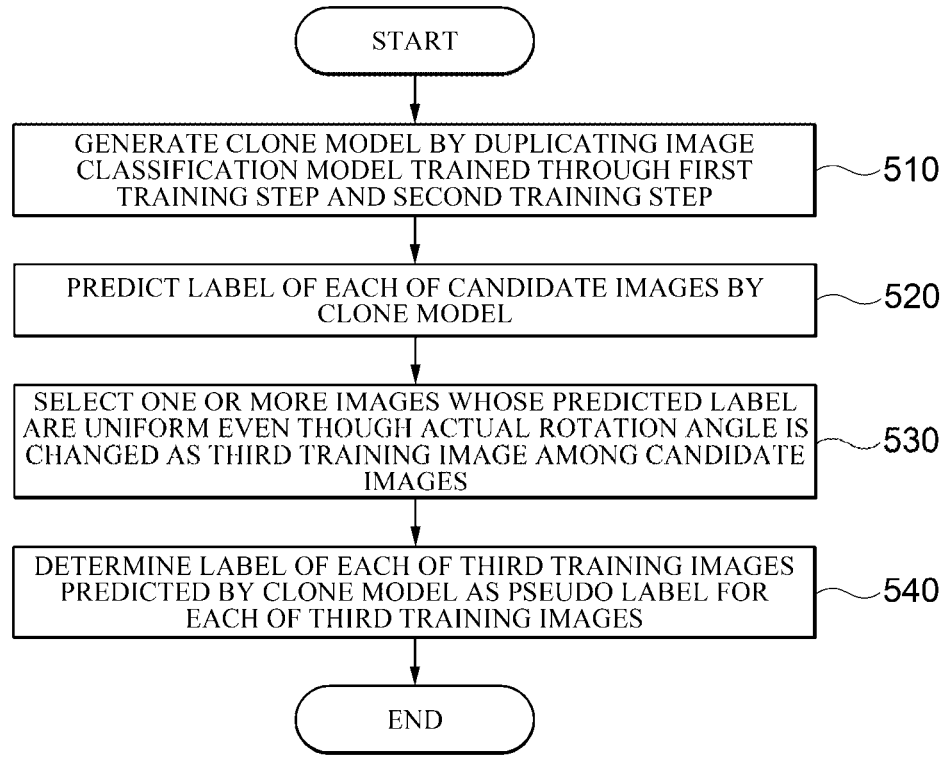
FIG. 5 is a flowchart for illustrating in detail a step of generating a pseudo label according to an embodiment.

FIG. 5 is a flowchart for illustrating in detail the step 230 of generating a pseudo label according to an embodiment. The method illustrated in FIG. 5 may be performed, for example, by the computing device 12 described above.

In step 510, the computing device 12 may generate a clone model by duplicating the image classification model trained through the first training step 210 and the second training step 220.

In step 520, the computing device 12 may cause the clone model to predict the label of each of the one or more candidate images. Specifically, the computing device 12 may input one or more candidate images to the feature extractor included in the clone model, and output the respective predicted labels of the one or more candidate images from the label classifier included in the clone model.

In step 530, the computing device 12 may select one or more images whose predicted labels are uniform as one or more third training images even though the actual rotation angle of each of the one or more candidate images is changed among the one or more candidate images.

In step 540, the computing device 12 may determine a label of each of the one or more third training images predicted by the clone model as a pseudo label for each of the third training images.

Specifically, the computing device 12 may select one or more images satisfying rotational consistency in the clone model among the one or more candidate images as the third training images. In this case, the computing device 12 regards the predicted label of each of the third training images as a label whose reliability has been proven in the clone model and uses the predicted label as a pseudo label in the third training step 240, thereby capable of improving the performance of the image classification model.

Referring back to FIG. 2, in the third learning step 240, the computing device 12 trains the image classification model so that the image classification model predicts the rotation angle of each of the one or more third training images, and predicts the label of each of the one or more third training images based on the pseudo label, but predicts a uniform label even though the actual rotation angle of each of the one or more third training images is changed.

That is, in the third training step 240 as in the second training step 220 described above, the computing device 12 trains the image classification model to have rotation consistency. In this regard, description will be made in detail with reference to FIG. 6 below.

Figure 6:
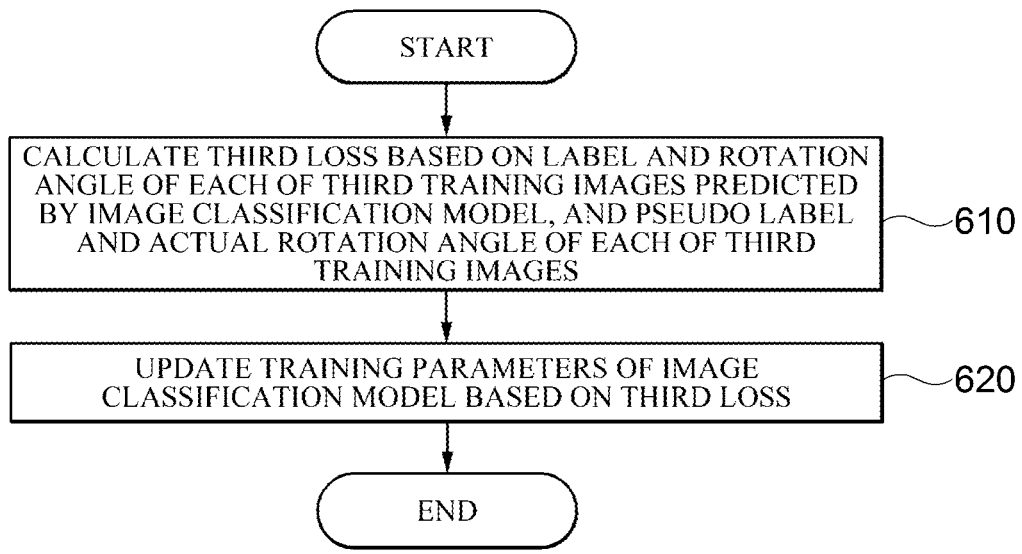
FIG. 6 is a flowchart for illustrating in detail a third training step according to an embodiment.

FIG. 6 is a flowchart for illustrating in detail the third training step 240 according to an embodiment. The method illustrated in FIG. 6 may be performed, for example, by the computing device 12 described above.

In step 610, the computing device 12 may calculate the third loss based on the label and rotation angle of each of the third training images predicted by the image classification model, and the pseudo label and actual rotation angle of each of the third training images.

Specifically, the computing device 12 may calculate the third loss based on the following (1) to (3).

(1) Second Label Loss Between Label of Each Second Training Image Predicted by Image Classification Model and Actual Label of Each Second Training Image According to an embodiment, the computing device 12 may calculate the second label loss between ground-truth and a vector corresponding to the pseudo label of each of the third training images by using the vector corresponding to the pseudo label of each of the third training images as the ground-truth.

Specifically, the second label loss may be calculated by a cross-entropy function using the ground-truth and the vector corresponding to the predicted label of each of the third training image as independent variables.

More specifically, the second label loss is a loss between the predicted label of the image and the pseudo label, and thus may be calculated based on Equation 6 below having a form similar to Equation 2 above.

$$L_{obj2} = -\sum_{i=0}^{B}\sum_{j=0}^{n-1} y'_{obj,(i),\left(\frac{360}{n}*j\right)} \log \hat{y}_{obj,(i),\left(\frac{360}{n}*j\right)}$$ [Equation 6]

In this case, $L_{obj2}$ represents the second label loss, B represents the number of the third training images, n represents the number of times the image is rotated by a unit rotation angle, and $$y'_{obj,(i),\left(\frac{360}{n}*j\right)}$$

represents a one-hot vector corresponding to a pseudo model of an i-th third training image, and $$\hat{y}_{obj,(i),\left(\frac{360}{n}*j\right)}$$

represents a vector corresponding to the predicted label of the i-th third training image.

(2) Second Mutual Information Loss Between Reference Label and Remaining Labels Among Respective Labels of the Third Training Images Predicted by Image Classification Model According to one embodiment, the computing device 12 may use a vector corresponding to the predicted label for the unrotated (rotated by 0 degrees) image among the respective predicted labels of the third training images as a reference and calculate a second mutual information loss between the reference and the vector corresponding to the labels predicted for the remaining rotated images (e.g., rotated by 90 degrees, rotated by 180 degrees, rotated by 270 degrees)

Specifically, the second mutual information loss may be calculated based on the sum of the mutual information values between the reference and each vector corresponding to the labels predicted for the respective remaining rotated images.

More specifically, the second mutual information loss is a loss related to a mutual difference between the predicted image labels, and may be calculated based on Equation 7 below having a form similar to Equation 3 above.

$$L_{MI2} = -\frac{1}{n}\sum_{i=0}^{B}\sum_{j=1}^{n-1} I\left(\hat{y}_{obj,(i),(0)}, \hat{y}_{obj,(i),\left(\frac{360}{n}*j\right)}\right)$$ [Equation 7]

In this case, $L_{MI2}$ represents the mutual information loss, B represents the number of third training images, n represents the number of times the image is rotated by a unit rotation angle, I(X,Y) represents a mutual information function between vector X and vector Y, $\hat{y}_{obj,(i),(0)}$ represents a vector corresponding to the predicted label of the i-th third training image rotated by 0 degrees (not rotated), and $$\hat{y}_{obj,(i),\left(\frac{360}{n}*j\right)}$$

represents a vector corresponding to the predicted label of the rotated i-th third training image.

(3) Second Rotation Angle Loss Between Rotation Angle of Each of Third Training Images Predicted by Image Classification Model and Actual Rotation Angle of Each of Third Training Images According to an embodiment, the computing device 12 may calculate the second rotation angle loss between ground-truth and a vector corresponding to the predicted rotation angle of each of the third training images by using the vector corresponding to the actual rotation angle of each of the third training images as the ground-truth.

In this case, the vector used as the ground-truth is obtained by rotating each of the third training images, and thus the ground-truth is not generated by separate labeling by the user.

Specifically, the second rotation angle loss may be calculated by a cross entropy function by using the ground-truth and the vector corresponding to the predicted rotation angle of each of the third training image as independent variables.

More specifically, the second rotation angle loss is a loss related to the rotation angle of the image, and thus the second rotation angle loss may be calculated by the following Equation 8 having a form similar to the above Equation 1.

$$L_{rot2} = -\sum_{i=0}^{B}\sum_{j=0}^{n-1} y_{rot,(i),\left(\frac{360}{n}*j\right)} \log \hat{y}_{rot,(i),\left(\frac{360}{n}*j\right)} \quad \text{[Equation 8]}$$

In this case, $L_{rot2}$ represents the second rotation angle loss, B represents the number of third training images, n represents the number of times the image is rotated by a unit rotation angle, $$y_{rot,(i),\left(\frac{360}{n}*j\right)}$$

represents a one-hot vector corresponding to an actual rotation angle of the i-th third training image, and $$\hat{y}_{rot,(i),\left(\frac{360}{n}*j\right)}$$

represents a vector corresponding to the predicted rotation angle of the i-th third training image.

According to an embodiment, the computing device 12 may calculate the third loss by performing weighted summation of the second label loss, the second mutual information loss, and the second rotation angle loss described above. In this case, a weight applied to each of the second label loss, the second mutual information loss, and the second rotation angle loss may be set by the user or may be determined by a separate process.

In step 620, the computing device 12 may update the training parameter of the image classification model based on the third loss.

According to an embodiment, the computing device 12 may update the training parameter of the image classification model by using a backpropagation method based on the third loss in the backward pass process.

Figure 7:
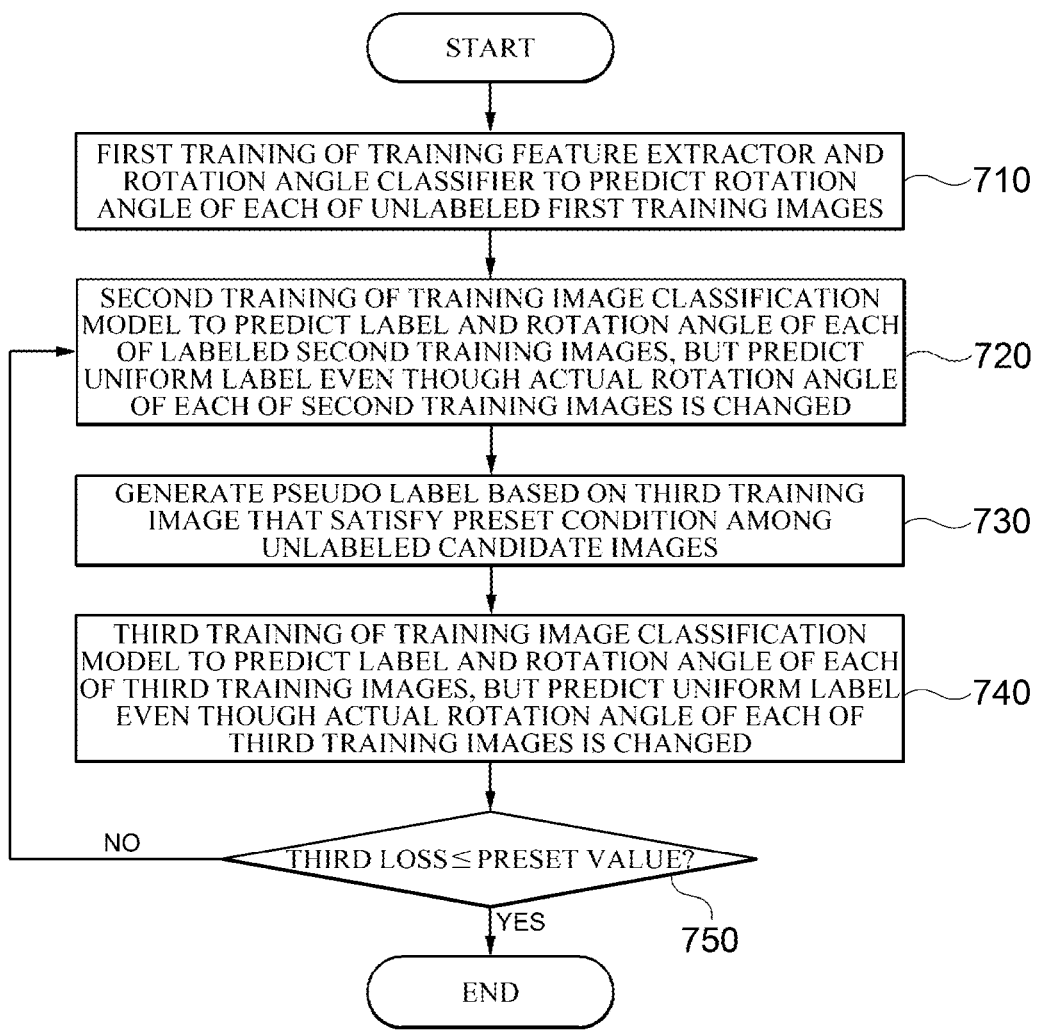
FIG. 7 is a flowchart for illustrating a method for training an image classification model according to an additional embodiment.

FIG. 7 is a flowchart illustrating a method for training an image classification model according to an additional embodiment. The method illustrated in FIG. 7 may be performed, for example, by the computing device 12 described above.

Steps 710 to 740 illustrated in FIG. 7 correspond to steps 210 to 240 described with reference to FIG. 2, respectively, and thus a redundant description thereof will be omitted.

In step 750, the computing device 12 checks whether the third loss calculated in step 610 above exceeds a preset value, and when the third loss exceeds the preset value, the computing device 12 may perform steps 720 to 740 again.

On the other hand, when it is determined that the image classification model has been sufficiently trained because the third loss converges to a preset value or less, the computing device 12 may end training by itself.

In the flowcharts illustrated in FIGS. 2 to 7, the method is described by being divided into a plurality of steps, but at least some of the steps may be performed in a different order, performed together in combination with other steps, omitted, performed by being divided into sub-steps, or performed by being added with one or more steps (not illustrated).

Figure 8:
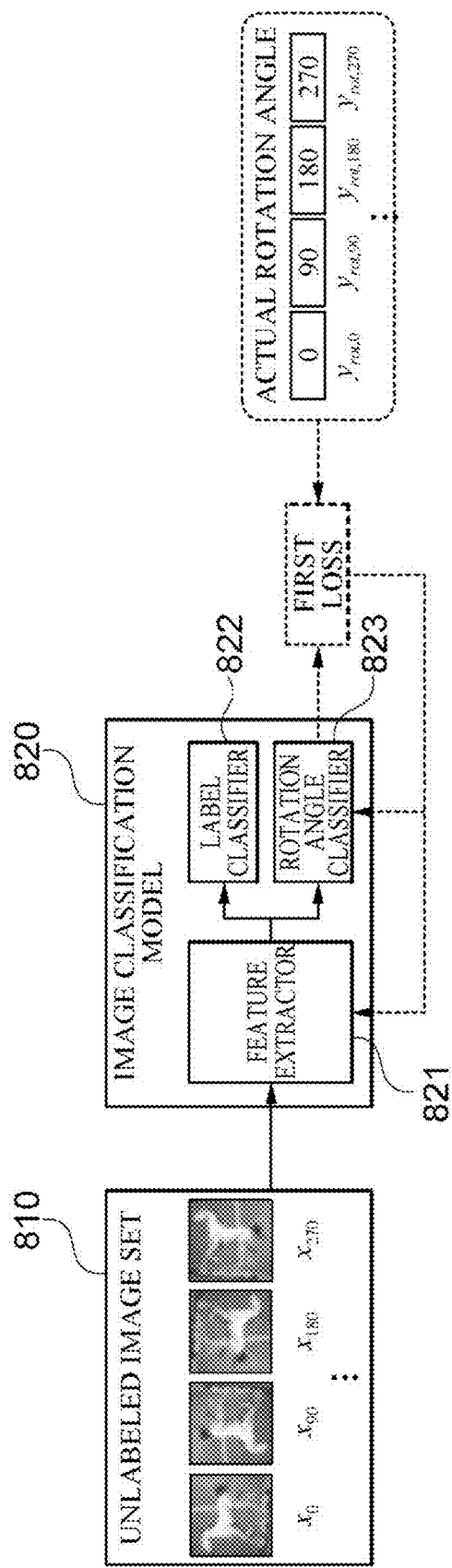
FIG. 8 is a diagram schematically illustrating the first training step according to the embodiment.

FIG. 8 is a diagram schematically illustrating the first training step 210 according to an embodiment.

Referring to FIG. 8, a first training image selected from an unlabeled image set 810 is input to a feature extractor 821 included in an image classification model 820.

Subsequently, the feature vector generated by the feature extractor 821 is input to each of a label classifier 822 and a rotation angle classifier 823.

Subsequently, a first loss between a rotation angle of each of the first training images predicted by the rotation angle classifier 823 and an actual rotation angle of each of the first training images is calculated.

Thereafter, training parameters of the feature extractor 821 and the rotation angle classifier 823 are updated based on the first loss.

Figure 9:
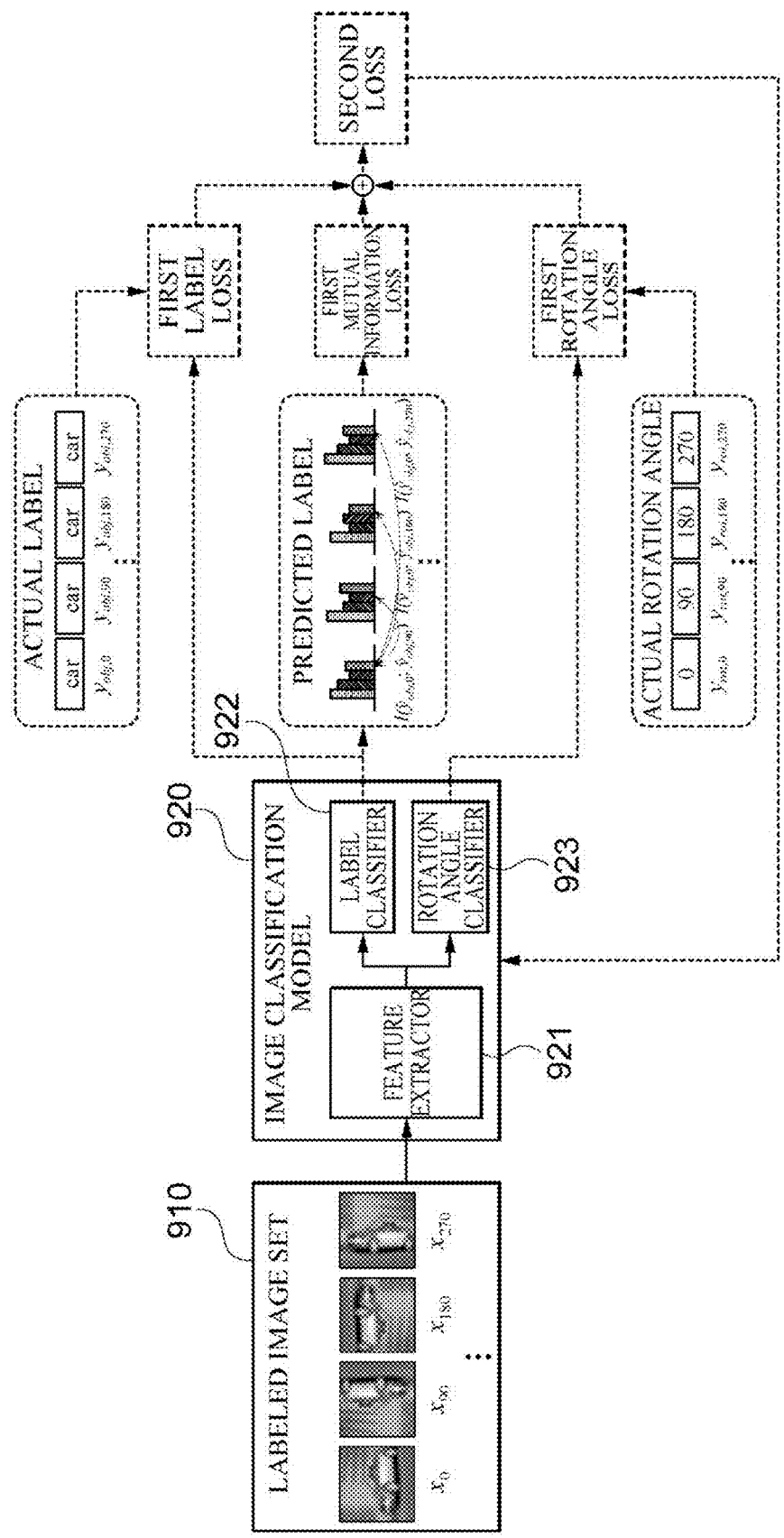
FIG. 9 is a diagram schematically illustrating the second training step according to the embodiment

FIG. 9 is a diagram schematically illustrating the second training step 220 according to an embodiment.

Referring to FIG. 9, a second training image selected from a labeled image set 910 is input to a feature extractor 921 included in an image classification model 920. In this case, the feature extractor 921, a label classifier 922, and a rotation angle classifier 923 in the image classification model 920 are in a state of having been subjected to the first training step 210.

Subsequently, the feature vector generated by the feature extractor 921 is input to each of the label classifier 922 and the rotation angle classifier 923.

Subsequently, a first label loss between the label of each of the second training images predicted by the label classifier 922 and the actual label of each of the second training images, a first mutual information loss between the respective labels of the second training images predicted by the label classifier 922, and a first rotation angle between the rotation angle of each of the second training images predicted by the rotation angle classifier 923 and the actual rotation angle of each of the second training images are calculated.

Thereafter, the training parameter of the image classification model 920 are updated based on the first label loss, the first mutual information loss, and the second loss generated based on the first rotation angle loss.

Figure 10:
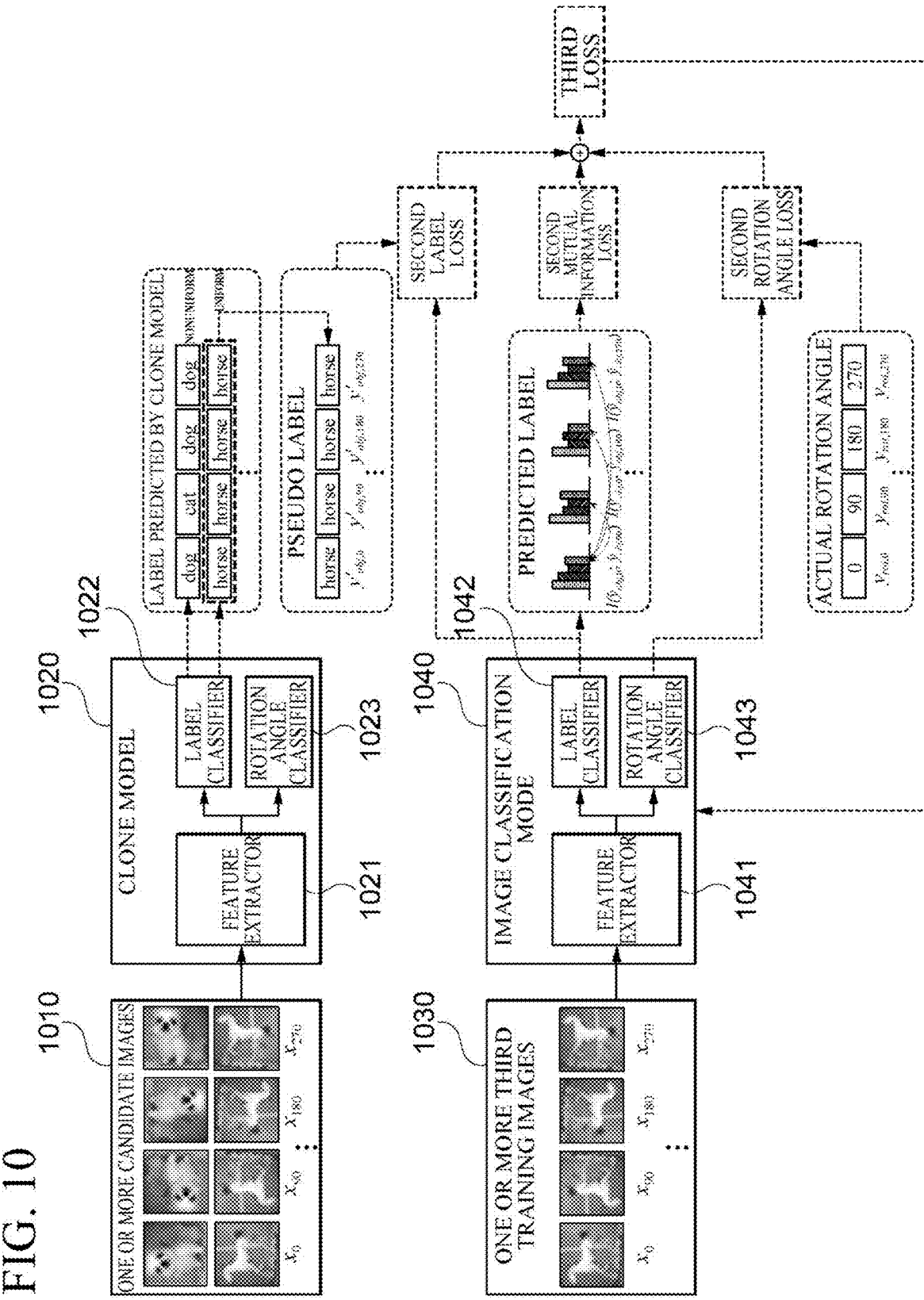
FIG. 10 is a diagram schematically illustrating the third training step according to the embodiment.

FIG. 10 is a diagram schematically illustrating the third training step 240 according to an embodiment.

Referring to FIG. 10, one or more candidate images (e.g., dog images and horse images) selected from an unlabeled image set 1010 are input to a feature extractor 1021 included in a clone model 1020. In this case, the feature extractor 1021, a label classifier 1022, and a rotation angle classifier 1023 in the clone model 1020 are in a state of having been subjected to the first training step 210 and the second training step 220.

Subsequently, the feature vectors generated by the feature extractor 1021 are input to the label classifier 1022 and the rotation angle classifier 1023, respectively.

Subsequently, among the respective labels of the candidate images predicted by the label classifier 922, a candidate image (e.g., the horse image) having a uniform label even though the rotation angle is changed is selected as the third training image, and the label of the corresponding candidate image is used as a pseudo label.

Subsequently, one or more third training images 1030 are input to a feature extractor 1041 included in an image classification model 1040. In this case, the feature extractor 1041, a label classifier 1042, and a rotation angle classifier 1043 in the image classification model 1040 are also in a state of having been subjected to the first training step 210 and the second training step 220.

Subsequently, the feature vectors generated by the feature extractor 1041 are input to the label classifier 1042 and the rotation angle classifier 1043, respectively.

Subsequently, a second label loss between the label of each of the third training images predicted by the label classifier 1042 and the pseudo label of each of the third training images, a second mutual information loss between the respective labels of the third training images predicted by the label classifier 1042, and the second rotation angle loss between the rotation angle of each of the third training images predicted by the rotation angle classifier 1043 and the actual rotation angle of each of the third training images are calculated.

Thereafter, the training parameters of the image classification model 1040 are updated based on the third loss generated based on the second label loss, the second mutual information loss, and the second rotation angle loss.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include a high-level language code that can be executed by a computer using an interpreter, etc., as well as a machine language code generated by a compiler.

According to the disclosed embodiments, an image classification model is subjected to semi-supervised learning by additionally using the label of the labeled image, as well as the rotation angle and the pseudo label of the unlabeled image, so that even when the labeled image is sparse, the image classification model can be made to have high image classification performance.

In addition, according to the disclosed embodiments, by training the image classification model to satisfy rotation consistency, it is possible to improve the image classification performance of the image classification model compared to the case of being trained through conventional semi-supervised learning.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A method for training an image classification model comprising a feature extractor, a label classifier, and a rotation angle classifier, the method comprising:
 a first training step of training the feature extractor and the rotation angle classifier to predict a rotation angle of each of one or more first training images selected from an unlabeled image set and rotated by a preset angle;
 a second training step of training the image classification model to predict a label and rotation angle of each of one or more second training images selected from a labeled image set and rotated by a preset angle, but predict a uniform label even though an actual rotation angle of each of the one or more second training images is changed;
 a step of generating a pseudo label based on one or more third training images that satisfy a preset condition among one or more candidate images selected from the unlabeled image set and rotated by a preset angle; and
 a third training step of training the image classification model to predict a rotation angle of each of the one or more third training images, and predict a label of each of the one or more third training images based on the pseudo label, but predict a uniform label even though an actual rotation angle of each of the one or more third training images is changed.

2. The method of claim 1, wherein the first training step comprises:
 a step of calculating a first loss based on the rotation angle of each of the first training images predicted by the rotation angle classifier and an actual rotation angle of each of the first training images; and
 a step of updating training parameters of the feature extractor and the rotation angle classifier based on the first loss.

3. The method of claim 1, wherein the second training step comprises:
 a step of calculating a second loss based on the label and rotation angle of each of the second training images predicted by the image classification model and an actual label and actual rotation angle of each of the second training images; and
 a step of updating training parameters of the image classification model based on the second loss.

4. The method of claim 3, wherein the step of calculating the second loss calculates the second loss based on a first label loss between the label of each of the second training images predicted by the image classification model and the actual label of each of the second training images, a first mutual information loss between a reference label and remaining labels among respective labels of the second training images predicted by the image classification model, and a first rotation angle loss between the rotation angle of each of the second training images predicted by the image classification model and the actual rotation angle of each of the second training images.

5. The method of claim 1, wherein the step of generating the pseudo label comprises:
 a step of generating a clone model by duplicating the image classification model trained through the first training step and the second training step;
 a step of predicting a label of each of the one or more candidate images by the clone model;
 a step of selecting one or more images, whose predicted label is uniform even though an actual rotation angle of each of the one or more candidate images is changed, of the one or more candidate images as the one or more third training images; and
 a step of determining the label of each of the one or more third training images predicted by the clone model as the pseudo label for each of the third training images.

6. The method of claim 1, wherein the third training step comprises:
 a step of calculating a third loss based on the label and rotation angle of each of the third training images predicted by the image classification model and the pseudo label and actual rotation angle of each of the third training images; and a step of updating training parameters of the image classification model based on the third loss.

7. The method of claim 6, wherein the step of calculating the third loss calculates the third loss based on a second label loss between the label of each of the third training images predicted by the image classification model and the pseudo label of each of the third training images, a second mutual information loss between a reference label and remaining labels among respective labels of the third training images predicted by the image classification model, and a second rotation angle loss between the rotation angle of each of the third training images predicted by the image classification model and the actual rotation angle of each of the third training images.

8. The method of claim 1, wherein, in the method for training the image classification model, when the third loss exceeds a preset value, the second training step, the step of generating the pseudo label, and the third training step are performed again.

9. An apparatus for training an image classification model, the apparatus comprising:
one or more processors; and
a memory storing one or more programs configured to be executed by the one or more processors,
wherein the program comprising instructions for causing the following steps of training an image classification model comprising a feature extractor, a label classifier, and a rotation angle classifier to be executed, the following steps comprising:
a first training step of training the feature extractor and the rotation angle classifier to predict a rotation angle of each of one or more first training images selected from an unlabeled image set and rotated by a preset angle;
a second training step of training the image classification model to predict a label and rotation angle of each of one or more second training images selected from a labeled image set and rotated by a preset angle, but predict a uniform label even though an actual rotation angle of each of the one or more second training images is changed;
a step of generating a pseudo label based on one or more third training images that satisfy a preset condition among one or more candidate images selected from the unlabeled image set and rotated by a preset angle; and
a third training step of training the image classification model to predict a rotation angle of each of the one or more third training images, and predict a label of each of the one or more third training images based on the pseudo label, but predict a uniform label even though an actual rotation angle of each of the one or more third training images is changed.

10. The apparatus of claim 9, wherein the first training step comprises
a step of calculating a first loss based on the rotation angle of each of the first training images predicted by the rotation angle classifier and an actual rotation angle of each of the first training images, and
a step of updating training parameters of the feature extractor and the rotation angle classifier based on the first loss.

11. The apparatus of claim 9, wherein the second training step comprises:
a step of calculating a second loss based on the label and rotation angle of each of the second training images predicted by the image classification model and an actual label and actual rotation angle of each of the second training images; and
a step of updating training parameters of the image classification model based on the second loss.

12. The apparatus of claim 11, wherein the step of calculating the second loss calculates the second loss based on a first label loss between the label of each of the second training images predicted by the image classification model and the actual label of each of the second training images, a first mutual information loss between a reference label and remaining labels among respective labels of the second training images predicted by the image classification model, and a first rotation angle loss between the rotation angle of each of the second training images predicted by the image classification model and the actual rotation angle of each of the second training images.

13. The apparatus of claim 9, wherein the step of generating the pseudo label comprises:
a step of generating a clone model by duplicating the image classification model trained through the first training step and the second training step;
a step of predicting a label of each of the one or more candidate images by the clone model;
a step of selecting one or more images, whose predicted label is uniform even though an actual rotation angle of each of the one or more candidate images is changed, of the one or more candidate images as the one or more third training images; and
a step of determining the label of each of the one or more third training images predicted by the clone model as the pseudo label for each of the third training images.

14. The apparatus of claim 9, wherein the third training step comprises:
a step of calculating a third loss based on the label and rotation angle of each of the third training images predicted by the image classification model and the pseudo label and actual rotation angle of each of the third training images; and
a step of updating training parameters of the image classification model based on the third loss.

15. The apparatus of claim 14, wherein the step of calculating the third loss calculates the third loss based on a second label loss between the label of each of the third training images predicted by the image classification model and the pseudo label of each of the third training images, a second mutual information loss between a reference label and remaining labels among respective labels of the third training images predicted by the image classification model, and a second rotation angle loss between the rotation angle of each of the third training images predicted by the image classification model and the actual rotation angle of each of the third training images.

16. The apparatus of claim 14, wherein the program further comprises instructions for executing the second training step, the step of generating the pseudo label, and the third training step again when the third loss exceeds a preset value.

* * * * *